R. H. GORSUCH.
AUTO SIGNALING DEVICE.
APPLICATION FILED MAY 13, 1920.
1,367,470.
Patented Feb. 1, 1921.
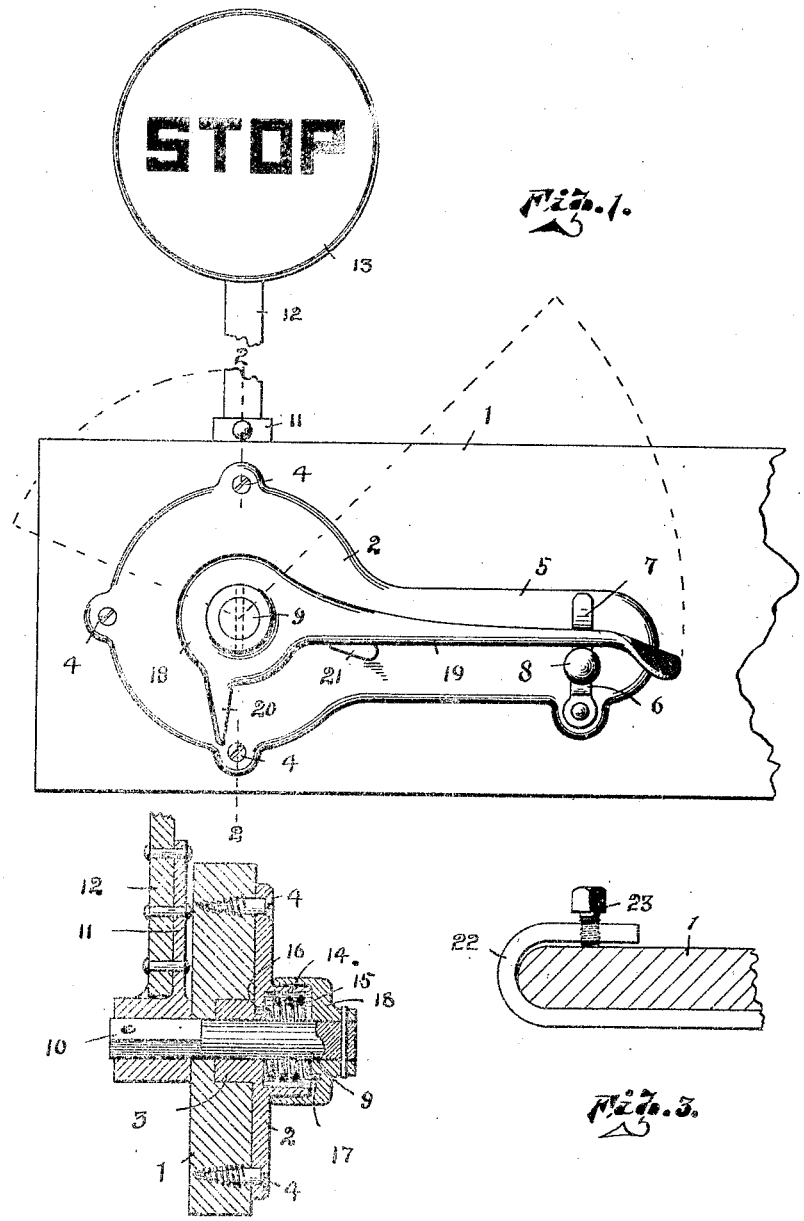

UNITED STATES PATENT OFFICE.

RICHARD H. GORSUCH, OF SUPERIOR, WISCONSIN.

AUTO SIGNALING DEVICE.

1,367,470.   Specification of Letters Patent.   Patented Feb. 1, 1921.

Application filed May 13, 1920. Serial No. 380,994.

*To all whom it may concern:*

Be it known that I, RICHARD H. GORSUCH, a citizen of the United States, residing at Superior, in the county of Douglas and State of Wisconsin, have invented certain new and useful Improvements in Auto Signaling Devices, of which the following is a specification, reference being had therein to the accompanying drawing.

This invention relates to signaling devices for vehicles and has special reference to means for signaling from an automobile.

The principal object is to produce a simple, compact and conveniently operated device of this character.

Other objects and advantages of the peculiar structure will appear in the further description of the invention.

In the accompanying drawings forming part of this application and in which like reference characters indicate like parts:

Figure 1 is an elevation of the controlling mechanism as it appears from the interior of the vehicle.

Fig. 2 is a vertical sectional view on the line 2—2, Fig. 1, and

Fig. 3 is a plan view partly in section of a modified form of attaching means for the device.

1 represents a fixed portion of the automobile conveniently accessible to the driver and in the illustration shown may represent one corner of the instrument board, upon which is mounted the metal body portion or holder 2 which has formed integral therewith an inwardly projecting hub 3 and which is designed to be fastened upon the end of the instrument board by suitable screws 4. The body 2 has an elongated horizontally extending portion 5 which supports at the outermost end thereof an upright spring member 6 having a hooked portion 7 upon the uppermost free end thereof and a thumb knob 8 spaced below the hooked portion 7 whereby pressure upon the thumb knob 8 will cause the hooked portion 7 to recede toward the instrument board and thus release an object being held by the hook.

Axially through the hub 3 is a central bore in which is rotatably mounted the shaft 9 the end of which toward the interior of the vehicle is rounded and the opposite end is square as at 10 and designed to carry a radially extending member 11 to which is attached the signaling arm 12 and this latter arm may carry upon the free end thereof any desired form of signal such as indicated at 13.

Upon the opposite side of the body 2 to that upon which the hub 3 is formed and concentric therewith is a hollow hub portion or annular rim 14 which acts as a housing for the spiral spring 15 installed about the shaft 9 and which spring has one end 16 thereof fixed within the body portion 2 while the opposite end 17 is fixed within the hub cap 18 the latter being non-rotatably carried by the innermost end of the shaft and provides a covering for the hub 14. The hub cap 18 has formed integral therewith the normally horizontally extending operating lever 19 as well as the dog or lug 20 which extends downwardly at right angles to the lever 19 and a stop 21 is rigidly fixed to the body 2 for governing the motion of the lever 19 downwardly as well as engaging the lug 20 when said lever is released and allowed to swing upwardly by the expansive action of the spring 15 and during which time the signal 13 will be thrown down and into exposed position from the side of the vehicle.

The spring 15 is of such strength and dimensions as to impart a rotary motion to the movable mechanism which it operates only during the initial portion of such operation with the object of acting as a cushion to the final portion of such motion, that is to say,—the combined office of the spring is to start the action of the device immediately upon release of the lever 19 by an inward thrust of the spring 6 which disengages the hooked portion 7 of the spring from the end of the lever and then to act as a retarding means or cushion for the downward thrust of the signal and lever 12—13 so as to prevent the lug 20 from injuriously contacting the stop 21 as the signal drops into active or displayed position and thus avoid undue jar or shock to the device when being operated in either direction. Another feature of the spring 15 is that of being expansive axially upon the shaft 9 so as to maintain a slight pressure endwise upon the shaft to prevent rattling, as is obvious.

In operation the signal is normally maintained in upright position as indicated in the drawings with the lever 19 engaged beneath the hook 7 of the spring 6 and when it is desired to expose the signal at the side of the vehicle for indicating the intended actions of the driver all that is necessary is to push the button 8 which will release the lever 19 and allow the signal arm 12 to fall outwardly and downwardly, its initial movement being started by the spring 15 as before described. Then when it is desired to return the signal to its vertical position the lever 19 is drawn back downwardly to engagement under the hook 7 where it is retained for further action.

In Fig. 3 I have shown a modified form of attaching the device to the instrument board or other part of the vehicle which comprises a metal hooked portion 22 which may, in any desired manner, be attached to the body 2 of the signal device and held against the object upon which it is supported by a suitable set screw 23, however this does not form any portion of my present invention.

Having thus described my invention, what I claim as new and desire to secure by Letters Patent is:

1. The combination with a fixed portion of a vehicle, of a holder, a rotatable shaft carried by the holder, a signal arm carried upon the outer end of the shaft, an operating lever non-rotatably fixed to the inner end of the shaft, means for normally holding the free end of the lever stationary when the signaling arm is inactive and a spiral spring about the shaft for assisting in the initial operation of the signal device and as a cushion for same.

2. A signaling device of the character described comprising a holder having two opposed hub portions, a shaft journaled within one of said hub portions and extending through the other, the latter having a cylindrical chamber therein considerably larger in diameter than the shaft, a signaling arm carried upon one end of the shaft, an operating lever carried upon the opposite end said lever having a cap-like hub portion surrounding the last mentioned hub portion of the holder said lever being disposed at right angles to the signaling arm, a spring controlled device for holding the free end of the lever in horizontal position and a spiral spring surrounding the shaft within the hub portion.

3. In a signaling device for vehicles, the combination with a fixed part of the vehicle of a holder having a hub portion embedded within said fixed part and an elongated portion extending horizontally and longitudinally of the fixed part, a manually operated spring catch at the extreme end of the elongated portion, a shaft journaled within said hub extending through and beyond said fixed part and through and beyond the housing in the opposite direction, a signal carrying arm non-rotatively carried upon the end beyond said fixed part, a concentric housing about the shaft extending from the holder in a direction opposite to that of the hub, a cap surrounding the housing non-rotatively fixed to the end of the shaft, and having an elongated operating handle thereupon engageable with the spring catch, a spiral spring within the housing about the shaft one end being fastened to the holder and the other to the cap, and a stop carried by the holder for limiting the rotative action of the shaft in either direction.

4. A signaling device for vehicles comprising a stationary horizontally elongated holder mounted upon the interior of the vehicle, a shaft journaled within the holder and extending to the exterior of the vehicle, a signaling arm carried upon the outer end of the shaft, a lever upon the opposite end of the shaft and at right angles thereto for operating it in one direction, a spring for operating the shaft in the opposite direction, a resilient catch carried by the holder for retaining the lever in a predetermined position and a stop for limiting the movement of the lever.

In testimony whereof I hereunto affix my signature in the presence of two witnesses.

RICHARD H. GORSUCH.

Witnesses:
ELLEN THEORIN,
S. GEO. STEVENS.